(12) United States Patent
Friess et al.

(10) Patent No.: US 8,321,868 B2
(45) Date of Patent: Nov. 27, 2012

(54) METHOD FOR COUNTING EVENTS IN A COMPUTER SYSTEM

(75) Inventors: Michael Friess, Boeblingen (DE); Anke Robeller, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 12/336,957

(22) Filed: Dec. 17, 2008

(65) Prior Publication Data

US 2009/0178041 A1    Jul. 9, 2009

(51) Int. Cl.
*G06F 9/30* (2006.01)
(52) U.S. Cl. .................................................... 718/102
(58) Field of Classification Search ......................... None
See application file for complete search history.

(56) References Cited

U.S. PATENT DOCUMENTS 6,112,318 A *   8/2000  Jouppi et al. ................. 714/47.1
8,010,969 B2 *  8/2011  Hankins et al. ............... 719/318

* cited by examiner

*Primary Examiner* — Robert Fennema
(74) *Attorney, Agent, or Firm* — Steven E. Bach (57) ABSTRACT

The invention relates to a method for counting events in an information technology system which performs one or more threads of executions, wherein an event counter is introduced comprising:
  a progress counter to be used across multiple threads of execution, counting the number of events emitted by one or more actions with a logical and dependency which occur in different threads of execution; and
  a local counter to be used within a single thread of execution counting the number of events emitted by one or more actions which occur within a single thread of execution.

22 Claims, 8 Drawing Sheets

METHOD FOR COUNTING EVENTS IN A COMPUTER SYSTEM

FIELD OF THE INVENTION

The invention pertains to computers and other information technology systems and, particularly, to enable monitoring and counting events in such systems.

BACKGROUND OF THE INVENTION

An event occurs when something significant happens in an information technology (IT) system. For instance, an event may be a business event, such as an application processing a new client order, or a system based event, such as a failure occurring in a critical part of the system.

Event infrastructures provide the runtime environment to route and/or persistently store and retrieve events from many different monitored systems. Monitors subscribe and receive events from an event infrastructure or directly from a monitored system.

The monitored application and system and the event infrastructure are typically designed for parallel execution to provide scalability. The parallel design of the monitored application or component can be realized through different programming models such as parallel execution of Enterprise Java beans in J2EE, specific programming languages for parallel systems, or business process execution languages such as BPEL.

The subscribing monitor often requires knowledge about the sequencing of event occurrences for various reasons. For instance, a metric can be calculated based on data gathered in two events A and B. The metric calculation may rely on the logical dependency of the two events, e.g. m=m+1 when one of the events occurs, and m=m*2 when the other of the events occurs.

One approach known in the art for dealing with logical dependencies is synchronization of emitting and transmitting events. When the emitting and transmitting of events is synchronized, events can be guaranteed to occur in order at the monitor, e.g. an event infrastructure. This approach imposes severe scalability problems in the monitored system.

Another approach is to deduce an event sequence based on a single event sequence counter. In this approach, every event includes an event counter. The event counter is unique per monitored component or application. In a transactional system this implies a sequencing of all transactions as a whole which results in a bottleneck and imposes scalability problems on the monitored system.

Another approach known in the art is to deduce an event sequence based on a timestamp. Following this approach, every event includes a timestamp of its occurrence. In a non-clustered system the event sequence can be deduced from the timestamp if the system clock is fine grained enough. In a clustered system clocks must be synchronized sufficiently fine-grained, which is an ambitious task and a challenge for implementation.

SUMMARY OF THE INVENTION

According to a sample embodiment of the invention a method is proposed for counting events in an information technology system which performs one or more threads of executions, wherein an event counter is introduced comprising a tuple of a progress counter and a local counter. The progress counter is to be used across multiple threads of execution, providing an order of events which occurs in different threads of execution. The local counter is to be used within a single thread of execution counting the number of events which occur within the single thread of execution. This event counter enables determination of the sequence of event occurrences as guaranteed by a component model. The component model represents a definition of the component and thus reveals the logical dependency of the component. The expression information technology system comprises e.g. a low-level simple computer system up to a high-level complex business process system. The component model describes logical dependencies of events on other events, i.e. one event can only occur if another event has happened before, and/or describes which events are not dependent on other events and can occur parallel. This can also be transitive—if an event E3 depends from an event E2 and the event E2 depends from an event E1 then the event E3 depends also from the event E1. According to the invention, the order relationship between two events is considered: only the relationship between two events where one event is logical dependent on the other is considered. No information is given about independent events.

The invention is particularly useful for monitored application and system and an event infrastructure which are typically designed for parallel execution. The effort for synchronizing event counters for parallel threads of executions is drastically reduced.

According to a sample embodiment of the invention, an event counter is provided which furnishes a correct result only in cases with logic dependencies, the effort for synchronizing of the progress counter can be minimized. It is not necessary to synchronize the complete transaction. Two synchronization approaches are possible: using a synchronized read and increment at the beginning, or using an unsynchronized read at the beginning and an increment at the end of a transaction.

A sample embodiment of the invention considers transactional systems in which events occur as a part of transactions in the monitored component/system. In this case, preferably, the progress counter can be maintained in a persistent store (e.g. a transactional database such as the DB2® database of IBM).

According to a sample embodiment, an increment step of the progress counter is performed once per thread of execution. In the increment step the progress counter is read from a data source, incremented and stored back to the data source. This increment step can be performed completely within the respective thread of execution or at least partly separate from the respective thread of execution. It is also possible that e.g. the read is performed separate from the respective thread of execution and incrementing the progress counter is done within the thread of execution.

According to a favorable method step in a sample embodiment, the progress counter is provided at the beginning of a thread of execution. The progress counter can be read unsynchronized from a data source containing values of the progress counter. This event counter enables determination of the sequence of event occurrences as guaranteed by a component model. At the end of the thread of execution (transaction) the progress counter can be incremented in a persistent store. Reading the counter is only necessary if the database system does not offer such an increment operation.

Alternatively, the progress counter can be read and incremented at the beginning of the thread of execution. No further synchronization is necessary for the rest of the transaction.

The progress counter PC needs to be maintained in a persistent store—typically in the database system. This can be realized by two approaches in current database systems:

the progress counters PC are stored per monitored component instance. For example, in a relational database the progress counter could be a table field in a table that has a primary key uniquely identifying the monitoring component instance;

the progress counter PC is shared across monitored component instances, e.g. by using a SQL Sequence object (SQL=structured query language).

The properties of the progress counter PC still hold, if the progress counter PC is shared across multiple monitored entities. Therefore an alternative realization could be with a so called "Sequence", a database object available in many current database systems. It must be assured that the integral data type for the progress counter PC has a range that is bigger than the number of transactions occurring in the monitored entity over its lifetime (approach 1.) or across all monitored entities sharing the progress counter PC (approach 2.).

According to a sample embodiment the increment can increase the progress counter by one. Alternatively, the increment can increase the progress counter by the number of events that occurred in the thread of execution that was executed. In this case, the progress counter can be used as a global event counter. This can be applied with the option to increment the progress counter at the end of the transaction as only then is the number of locally occurred events known.

In a case where events occur in parallel threads of execution, a join step can be performed in a subsequent thread of execution which depends on the end of all parallel threads of execution.

Alternatively, in a case where events occur in parallel threads of execution, a join step can be performed in a one of the parallel threads of execution if/when all other threads of executions are completed. The progress counter must be read again before the joined step is executed.

It is also possible to read the progress counter when the first event is emitted. This optimization can be done for the read at the beginning of a transaction as well as in the case of a join step. This helps to avoid unnecessary read steps if no events are emitted in the transaction.

According to a sample embodiment, the event counter is partially ordered with respect to at least logically dependent events. That is, the order is defined for logical dependent events. Particularly, for a first event and a second event which occur in different threads of execution, the event counter for the second event is larger than event counter for the first event if the progress counter for the second event is larger than the progress counter for the first event.

For a first event and a second event which occur in the same thread of execution, the event counter for the second event is larger than event counter for the first event if the progress counter for the second event is equal to the progress counter of the first event and the local counter for the second event is larger than the local counter for the first event. The progress counter for multiple events in the same thread of execution is the same except for the case that a join step is executed.

If a second event is modeled to be sequentially executed after a first event, than the event counter for the second event is larger than the event counter for the first event.

According to a further aspect of the invention in certain embodiments thereof, a program product is proposed comprising a computer useable medium including a computer readable program, wherein the computer readable program when executed on a computer causes the computer to introduce an event counter comprising a progress counter to be used across multiple threads of execution, counting the number of events with a logical and/or physical dependency which occur in different threads of execution; and a local counter to be used within a single thread of execution counting the number of events which occur within a single thread of execution.

According to a further aspect of the invention in certain embodiments thereof, a data processing system is provided for execution of a data processing program comprising software code portions for performing the above-mentioned method when the above-mentioned program is run on the above-mentioned computer.

According to a further aspect of the invention in certain embodiments thereof, a data processing program is proposed for execution in a data processing system comprising software code portions for performing a method when said program is run on a computer, wherein an event counter is introduced comprising a progress counter to be used across multiple threads of execution, counting the number of events with a logical and/or physical dependency which occur in different threads of execution; and a local counter to be used within a single thread of execution counting the number of events which occur within a single thread of execution.

BRIEF DESCRIPTION OF THE DRAWINGS

The present invention together with various objects and advantages may best be understood from the following detailed description of the embodiments read in conjunction with the following drawings in which.

The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

Figure 1:
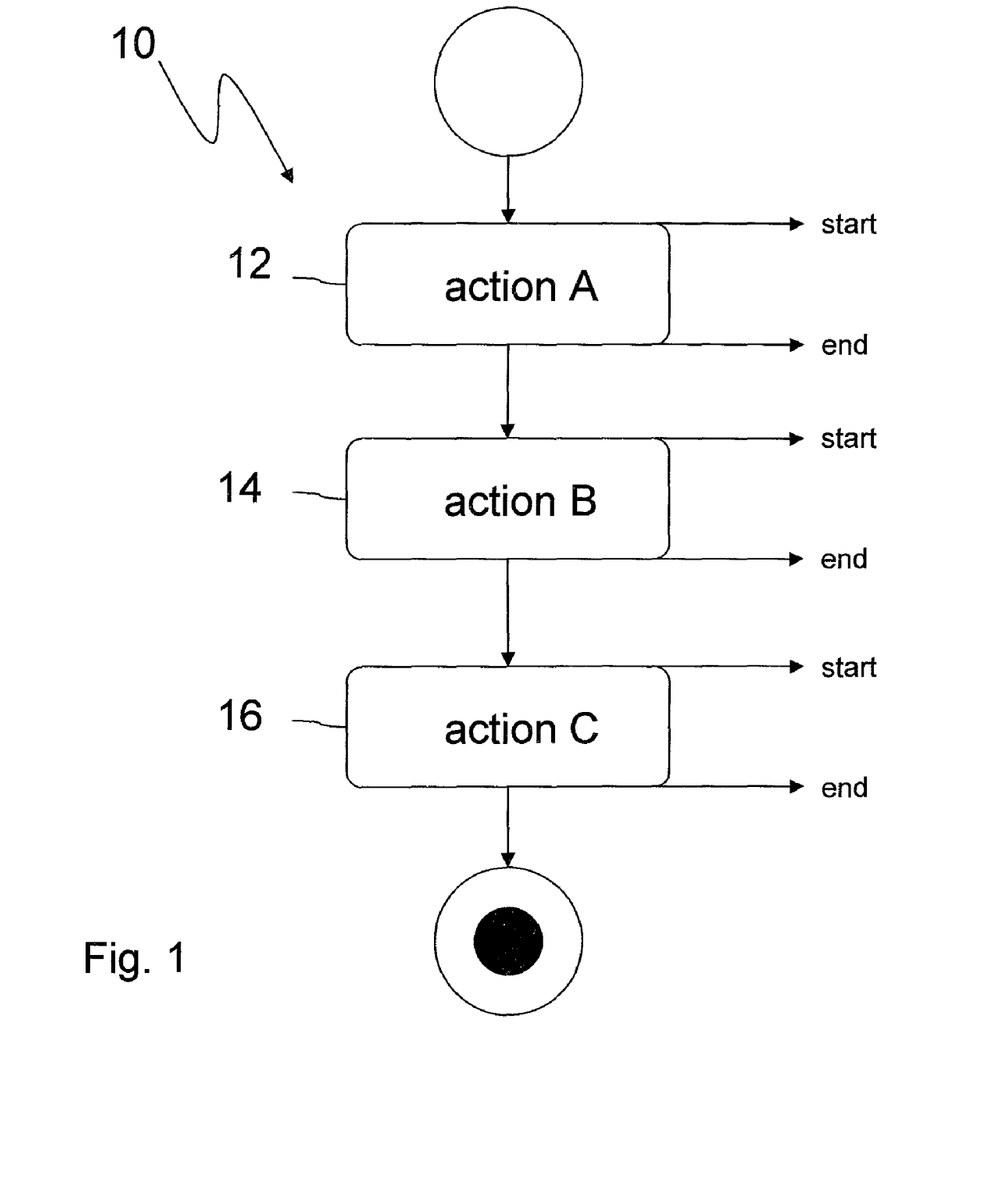
FIG. 1 a flow diagram showing a sequential model with events.
Figure 2:
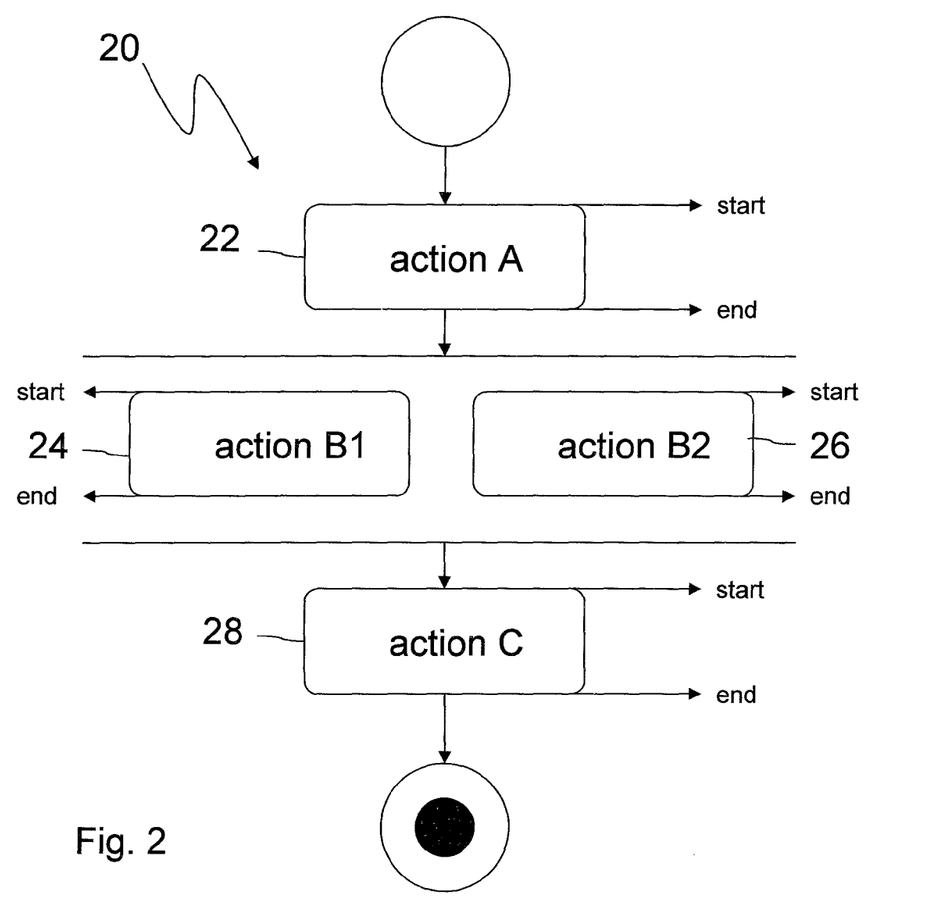
FIG. 2 a flow diagram showing a parallel model with events.

FIG. 1 and FIG. 2 illustrate sample component models for a sequential and for a parallel process system, respectively, with occurrences of possible actions A, B, C. In general, A, B and C denote single actions/steps in one or more threads of execution. A sample case of a thread of execution is e.g. a transaction. A sample case of an action is an activity in e.g. a business process. For instance, a significant event can be that an action has started or finished.

The process can be a simple IT system where e.g. failures and/or successful operations are monitored or up to a complex business process system where various parameters of the process are monitored, e.g. with respect to a duration of feedback of a supplier, a duration of handling of orders and the like. An event infrastructure is provides between the system and a user/consumer who monitors the system.

By way of example, the monitor realizes the business process as a "black box" with occurrences of events. In order to analyze the process, knowledge about the sequence order of the occurring events is necessary. However, particularly in complex infrastructure with a distributed system, e.g. with several servers where the process is running, one first event can happen before another second event but the second event might occur at the monitor before the first event. In general, the sequence of the events at the monitor is not necessarily equal to the sequence of the occurrence of the events.

FIG. 1 depicts a representation of a sequential model 10 with possible action A, B, C. In step 12, action A occurs with start and end of the action A, emitting an event "start" of action A and "end" of action A which is indicated by arrows and labels start and end. Following action A, action B happens in step 14 and subsequently action C occurs in step 16. The order of the actions A, B, C is known. Action B can only occur if action A has happened and an occurrence of action C requires the occurrence of action B and, therefore, the events "start" and "end" of action B and "start" and "end" of action C are emitted accordingly.

FIG. 2 illustrates a representation of a parallel model 20 with action A in step 22, two parallel actions B1 (step 24) and B2 (step 26), and a subsequent action C in step 28. Action C requires the occurrence of the actions A followed by the actions B1 and B2. The sequence of action B1 in relation to action B2 is not known, i.e. it is not known if action B1 starts before or after action B2.

Typically, business processes and the like are a mixture of sequential and parallel threads of execution. A calculation of an event counter can be reasonable if the monitor knows if two or more events can occur independently or not. The monitor can only rely on the sequence if the sequence is predetermined by the model or the definition (logical dependency), respectively. For instance, metrics can be calculated using operations wherein the result is dependent on the sequence. Such a calculation is not deterministic if the sequence cannot be guaranteed. Other calculations, however, can be deterministic independent of the sequence, e.g. when commutative and associative laws are valid. In these cases, the sequence is irrelevant per definition.

An event counter EC is introduced comprising a progress counter PC to be used across the multiple threads of execution or transactions counting the number of events with a logical dependency which occur in different threads of execution, e.g. transactions, and a local counter LC to be used within a single thread of execution counting the number of events which occur within a single thread of execution, e.g. transaction.

The progress counter PC needs to be maintained across threads of execution. In transactional systems this is achieved by means of a persistent store—typically realized by a database system (not shown).

The two statements "Get PC" and "Inc PC" in the following drawings indicate the operations necessary to read ("Get PC") and increment ("Inc PC") the progress counter PC in the persistent store.

"Get PC" means to read the progress counter PC from the persistent store. The read does not lock the database value, i.e. the read is unsynchronized. While the transaction (thread of execution) progresses, it may change, e.g. be incremented, due to other transactions (threads of execution). According to the invention the progress counter value is exclusively increased, and therefore the order relation does not change.

"Inc PC" means to increment the progress counter PC in the persistent store. The increment is based on the current value in the database, not on the read value from e.g. the beginning of the thread of execution. If the database does not provide an "increment" operation, the value of the progress counter PC must be read, incremented and stored back in a separate, particularly a single local, transaction. The increment is also referred to as increment step for the progress counter PC.

Figure 3:
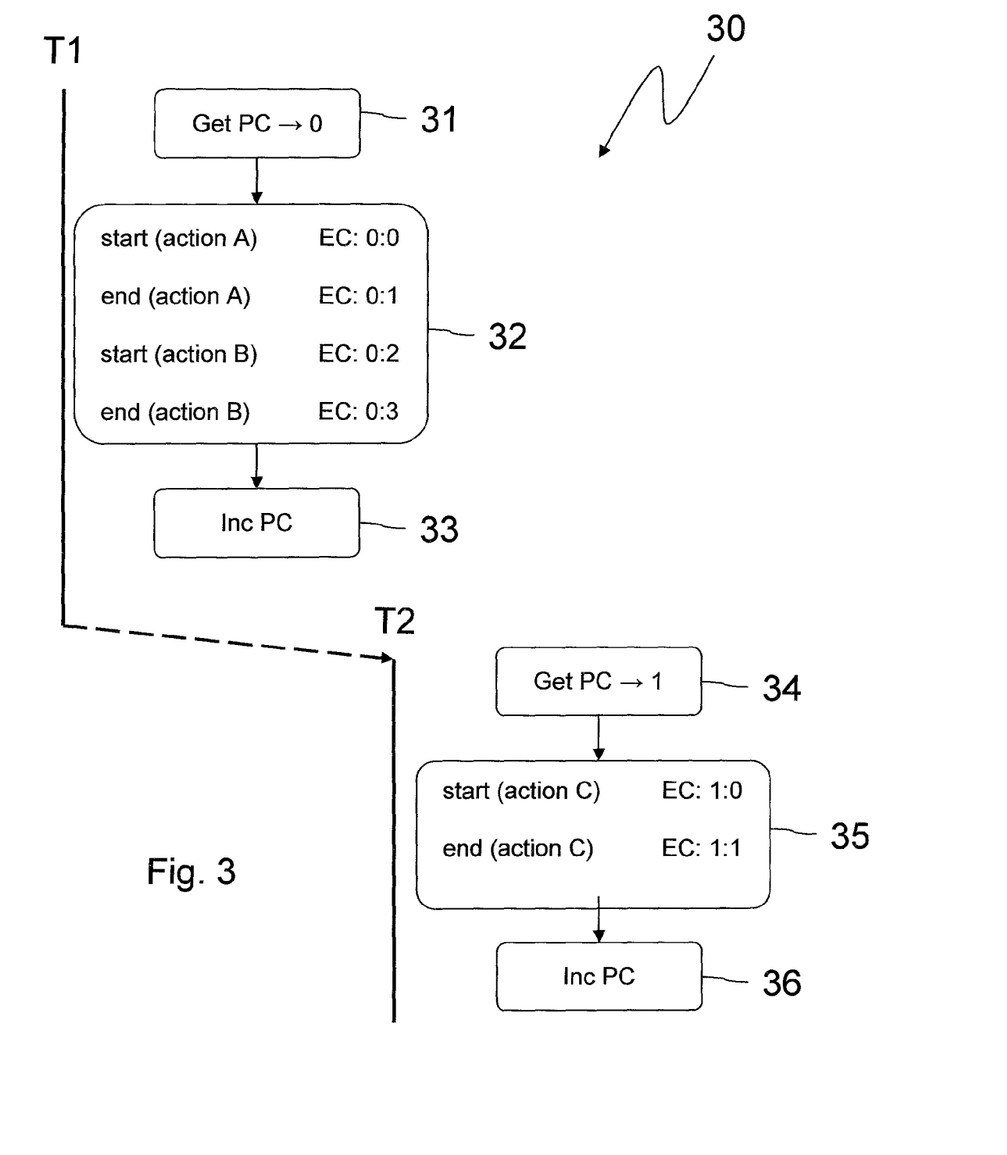
FIG. 3 a representation of multiple threads of execution in a sequential model, representing an event counter according to an embodiment of the invention.

A preferred method according to an embodiment of the invention for counting events for actions A, B, C in e.g. an information technology system which performs two threads of executions T1 and T2 is illustrated in a flow chart 30 in FIG. 3.

An event counter EC is introduced comprising a progress counter PC to be used across the multiple threads of execution T1, T2 counting the number of events for actions A, B, C with a logic dependency which occur in different threads of execution T1; T2, and a local counter LC to be used within a single thread of execution T1 or T2 counting the number of events for actions A, B and C which occur within a single thread of execution T1; T2. In transactional systems these threads of execution are called transactions.

In the first thread of execution T1, action B succeeds action A. At the beginning of the thread of execution T1, the progress counter PC is read in step 31, e.g. from a database as described above. The read is done unsynchronized. By way of example, the read progress counter is PC=0. Thus, in step 32, the event counter EC starts with PC=0 and LC=0 (EC=0:0). Depending on the circumstances, other values for PC an LC can apply.

In step 32 action A emits events "start" and "end" of action A succeeded by action B which emits events "start" and "end" of action B subsequent to the emission of the event "end" of action A. Consequently, the local counter LC starts with LC=0 at the emission of the event "start" of action A (EC=0:0), LC=1 at the emission of the event "end" of action A (EC=0:1), LC=2 at the emission of the event "start" of action B (EC=0:2) and LC=3 at the emission of the event "end" of action B (EC=0:3). By emission of the respective start and end events of the actions A, B and C, the actual event counter EC receives the actual progress counter and local counter values and can be stored for a later analysis by the monitor.

After the emission of the event "end" of action B, the progress counter PC is incremented by 1 in step 33. For doing so, the progress counter PC is read from a database (not shown) for fetching the actual progress counter PC and incremented subsequently. The progress counter PC read in step 33 is independent from the progress counter PC read in step 31 as another event on which the action A and B depend might have occurred within the monitored system and changed the stored progress counter values. The incremented progress counter PC is then stored back for actualizing the database.

After terminating the first thread of execution T1, a second thread of execution T2 starts wherein action C occurs. In step 34 the progress counter PC is read from a database. By way of example, the progress counter PC read from the database is PC=1, because the thread of execution T1 is finished and has incremented the progress counter PC. The second thread of execution T2 can only occur after the first thread of execution T1 has finished as action C is logically dependent on action B. At start of action C the event counter EC contains the progress counter PC=1 and the local counter LC=0 (EC=1:0) and at the end of action C the local counter yields LC=1 with PC=1

(EC=1:1) in step 35. The progress counter PC is read from a database, incremented and stored back in step 36. Again, the progress counter PC read in step 36 is not the progress counter PC read in step 34. By reading the progress counter PC again at the end of the threads T1 and T2 the actual value of the progress counter PC is available and the actions A, B, C can be ordered according to their proper sequence with their appropriate event counter EC. Between the respective events emitted by actions A and B, the local counter LC signifies the order, while the progress counter PC is unchanged. Between the respective events emitted by the actions B and C, the progress counter PC signifies the order. The information related to the event counter EC was already passed on when the events (e.g. stop of action C) were emitted.

It should be mentioned that all Figures illustrate what happens on the producer side. The monitor receives the events, e.g. start of action A with EC 0:0, stop of action C with EC 1:1. The event counters EC are then used to reorder events and process events in sequence.

Figure 4:
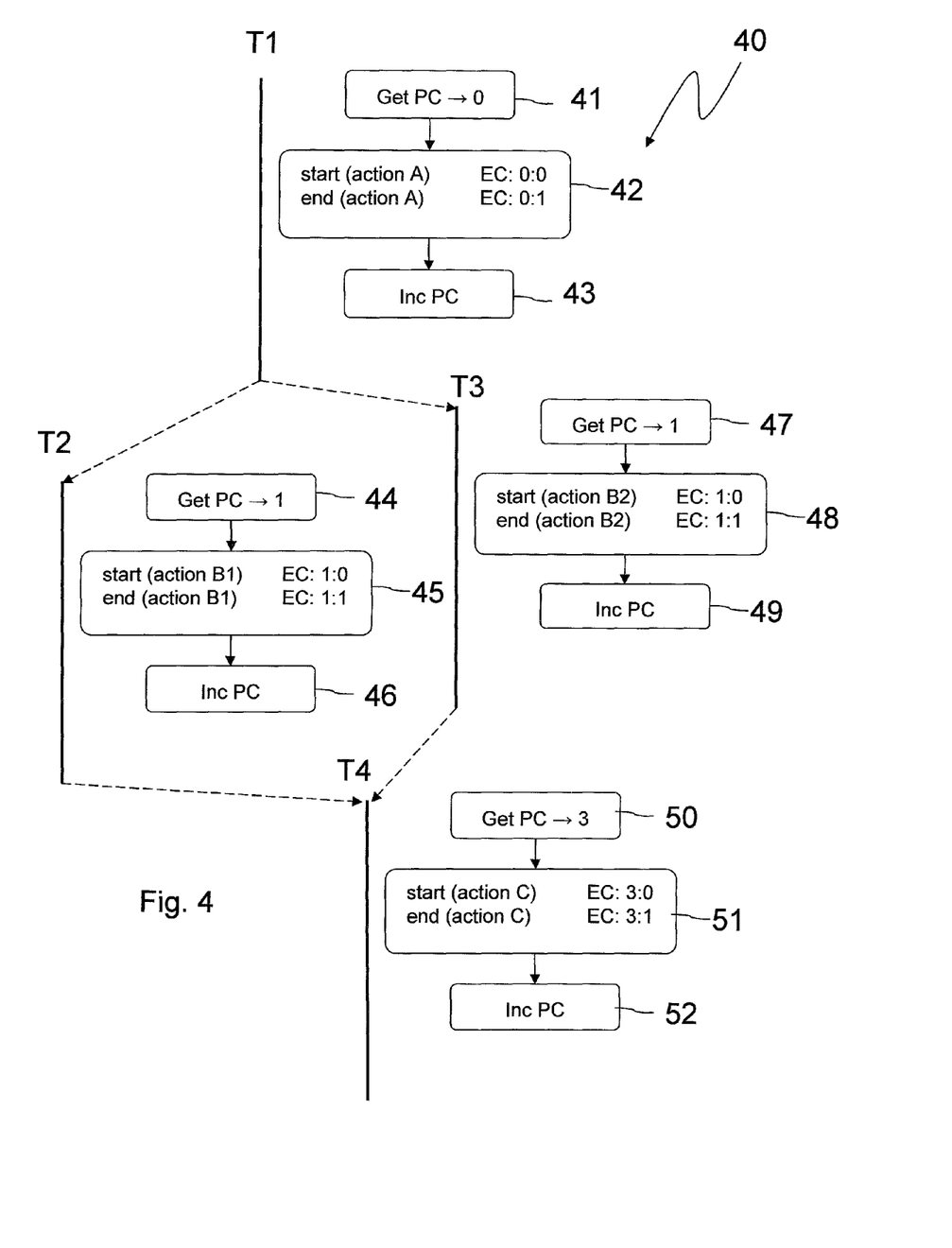
FIG. 4 a representation of multiple threads of execution in a model with a join step after parallel threads of execution, representing an event counter according to an embodiment of the invention.

FIG. 4 illustrates an execution 40 of the process model defined in FIG. 2 with multiple threads of execution T1, T2, T3, T4 in a model with a join step at the beginning of T4 after parallel threads of execution T2, T3. These, in turn, follow after the first thread of execution T1.

In step 41 of the thread of execution T1 the actual value of the progress counter PC is read unsynchronized. For instance the progress counter is PC=0. Action A starts and ends in step 42 yielding a local counter LC=0 at the start (EC=0:0) and LC=1 at the end (EC=0:1). In step 43 the actual value of the progress counter PC is read, incremented and stored back to the database.

In the second thread of execution T2 the progress counter PC is read from the database in step 44, start of action B1 and end of action B1 occurs in step 45 and the progress counter PC is read, incremented and stored back in step 46. By way of example, the read progress counter PC in step 44 is PC=1, yielding event counters EC in step 45 with PC=1, LC=0 (EC=1:0) at the start and PC=1 and LC=1 at the end of action B1 (EC=1:1). In the third thread of execution T3 the progress counter PC is read from the database in step 47, start of action B2 and end of action B2 occurs in step 48 and the progress counter PC is read, incremented and stored back in step 49. By way of example, the read progress counter PC in step 47 is PC=1, yielding event counters EC in step 48 with EC=1:0 (PC=1, LC=0) at the start and EC=1:1 (PC=1 and LC=1) at the end of action B2.

The third thread of execution T3 starts earlier and ends earlier than the second thread of execution T2. Now the threads of execution T2, T3 join at a fourth thread of execution T4 in which action C happens. In step 50 of the fourth thread of execution T4 the progress counter PC is read unsynchronized, yielding PC=3, as the threads of execution T1, T2, T3 each must have been finished and have performed their increments. Action C emits the events "start" and "end" in step 51, yielding the local counter LC=0 at the start event (EC=3:0) and LC=1 at the end event of the action C (EC=3:1). The progress counter PC is read, incremented and stored back in step 52.

Figure 5:
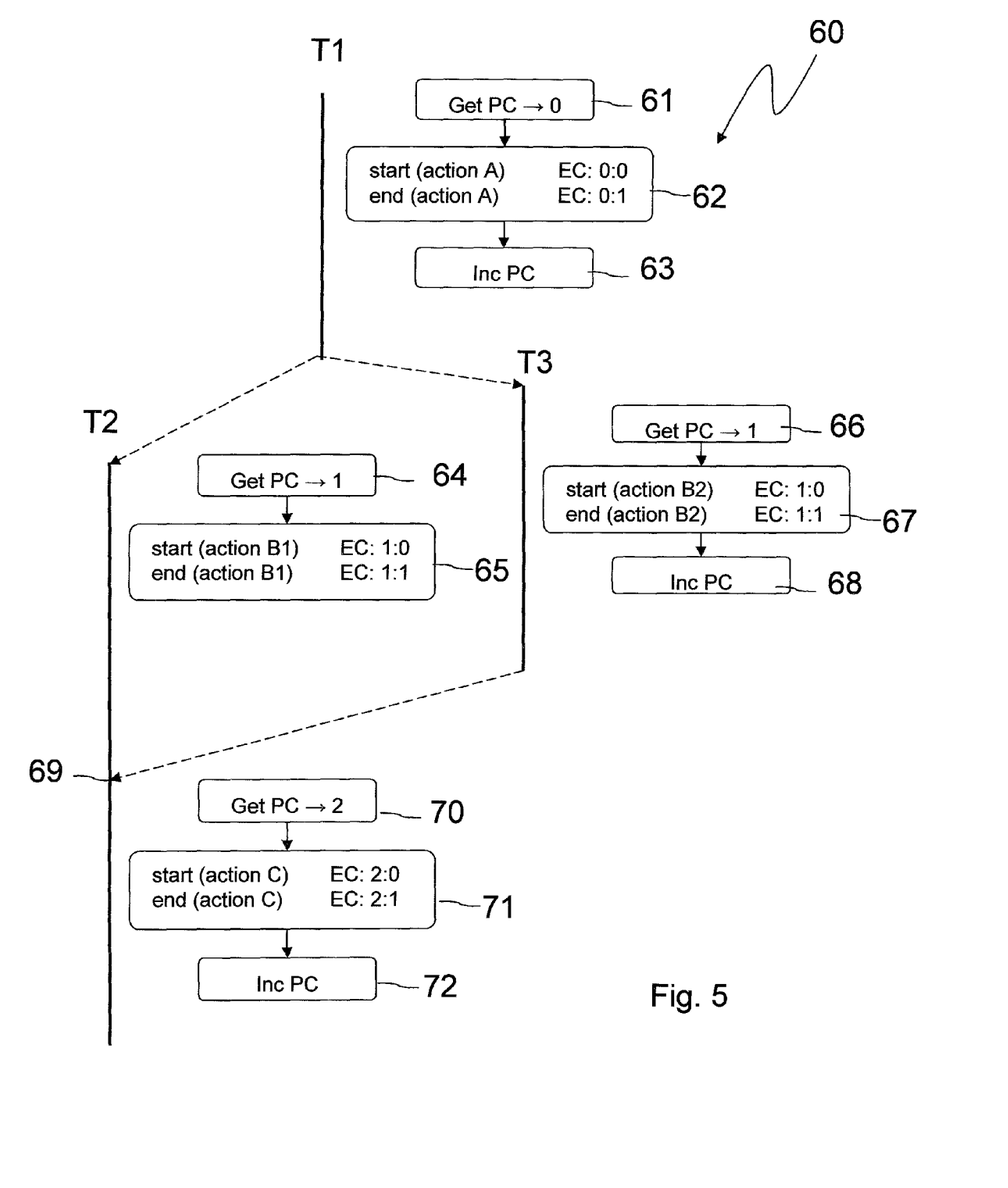
FIG. 5 a representation of multiple threads of execution in a model with a join step in one of two parallel threads of execution, representing an event counter according to an embodiment of the invention.

An event counter EC for an optimized join handling is illustrated in FIG. 5 in a flow chart 60 with multiple threads of execution T1, T2, T3.

In step 61 of the first thread of execution T1 the actual value of the progress counter PC is read unsynchronized. For instance the progress counter is PC=0. Action A starts and ends in step 62 yielding a local counter LC=0 at the start (EC=0:0) and LC=1 at the end (EC=0:1). In step 63 the actual value of the progress counter PC is read, incremented and stored back to the database.

In the second thread of execution T2 the progress counter PC is read from the database in step 64, start of action B1 and end of action B1 occurs in step 65. By way of example, the read progress counter PC in step 64 is PC=1, yielding event counters EC in step 64 with PC=1, LC=0 (EC=1:0) at the start and PC=1 and LC=1 at the end of action B1 (EC=1:1).

In the third thread of execution T3 the progress counter PC is read from the database in step 66, start of action B2 and end of action B2 occurs in step 67 and the progress counter PC is read, incremented and stored back in step 68. By way of example, the read progress counter PC in step 66 is PC=1, yielding event counters EC in step 67 with EC=1:0 (PC=1, LC=0) at the start and EC=1:1 (PC=1 and LC=1) at the end of action B2.

The third thread of execution T3 finishes and while reaching the point where actions B1 and B2 in the process model join at 69, the execution of the second thread of execution T2 determines that action B2 is finished—by the third thread of execution T3 being finished—and therefore continues execution with the next action after the join 69.

In step 70 the progress counter PC is read unsynchronized, yielding e.g. PC=2, with action C starting and ending in step 71, yielding the local counter LC=0 at the start (EC=2:0) and LC=1 at the end of the action C (EC=2:1). The progress counter PC is read, incremented and stored back in step 72.

Figure 6:
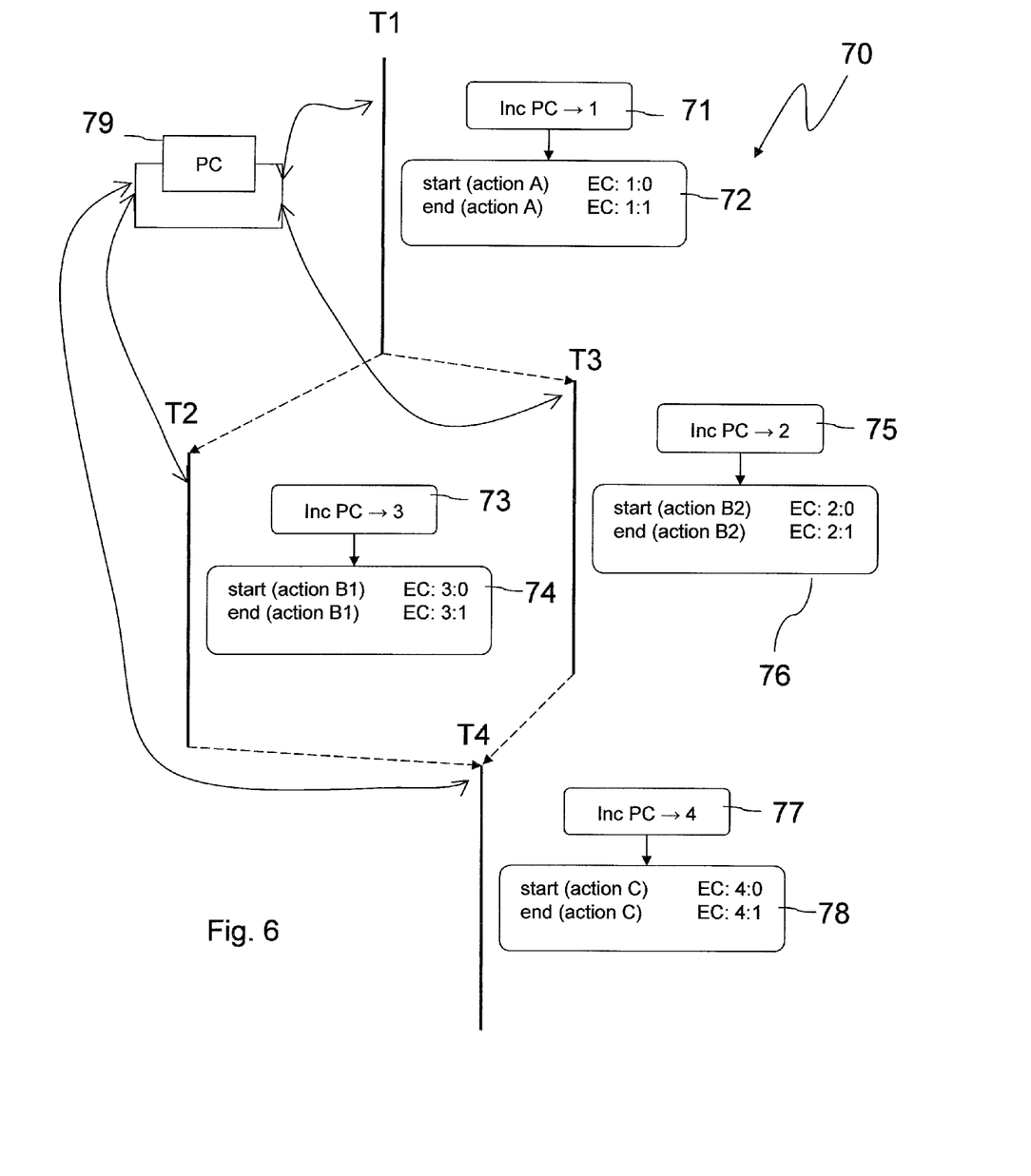
FIG. 6 a representation of an event counter according to embodiments of the invention with an increment of a progress counter at transaction begin.

FIG. 6 illustrates a representation of an event counter EC with read, increment and store back of the progress counter PC at the beginning of a transaction at the top of each thread of execution T1, T2, T3, T4. This is done in a separate transaction in step 79, and not as a part of the threads of execution T1, T2, T3, T4 as in the preceding embodiments described above.

In step 71 of the first thread of execution T1 an incremented progress counter PC is provided yielding PC=1, and action A occurs in step 72. At the start of action A, the local counter is LC=0 and at the end of action A the local counter is LC=1, yielding event counters EC=1:0 and EC=1:1, respectively.

In step 73 of the second thread of execution T2 an incremented progress counter PC is provided yielding PC=3, and action B1 occurs in step 74. At the start of action B1, the local counter is LC=0 and at the end of action B1 the local counter is LC=1, yielding event counters EC=3:0 and EC=3:1, respectively.

In step 75 of the parallel third thread of execution T3 an incremented progress counter PC is provided yielding PC=2 and action B2 occurs in step 75. At the start of action B2 in step 76, the local counter is LC=0 and at the end of action 132 the local counter is LC=1, yielding event counters EC=2:0 and EC=2:1 respectively.

The second and third threads of execution T2, T3 are joined before the fourth thread of execution T4.

In step 77 of the fourth thread of execution T4 an incremented progress counter PC is provided yielding PC=4, and action C occurs in step 78. At the start of action C, the local counter is LC=0 and at the end of action C the local counter is LC=1, yielding event counters EC=4:0 and EC=4:1, respectively.

Figure 7:
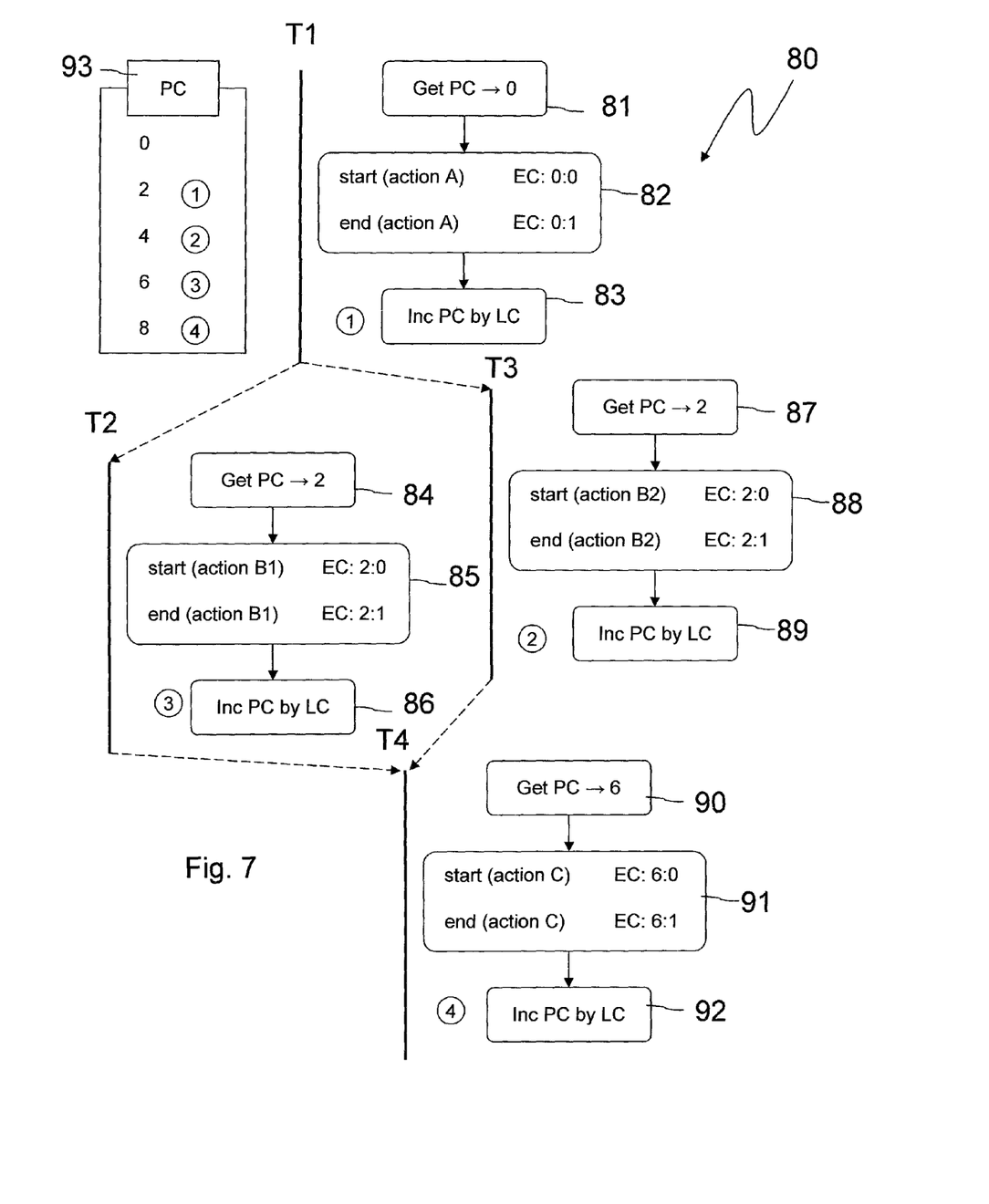
FIG. 7 a representation of an event counter according to an embodiment of the invention with calculating a number of events.

FIG. 7 illustrates a representation of an event counter EC according to an embodiment of the invention with calculation of a number of events.

The progress counter PC may be used to determine the number of emitted events of actions A, B1, B2, C. Such emitted events are start and end of action A; start and end of action B1; start and end of action B2 and start and end of action C. The progress counter thus yields a global event counter, when the realization of the event counter EC meets the following constraints:

the local counter LC is incremented by 1 once and only once when an event is emitted;

the progress counter PC is incremented as part of the (global) transaction (thread of execution T1, T2, T3 or T4). Therefore it is once and only once incremented for each transaction T1, T2, T3 or T4;

the progress counter PC is incremented by the local counter LC which equals the number of events emitted by actions A, B, C in that transaction T1, T2, T3 or T4.

After all transactions T1, T2, T3 and T4 are finished the progress counter PC contains the number of emitted events. This is regardless of the sequence of parallel transactions T2, T3, because the addition operation (increment) adheres to the associative law.

A final event could be emitted at the end of the last transaction T4 containing the progress counter PC. The monitoring system can use the progress counter PC to determine whether it has received all emitted events.

The flow chart 80 of FIG. 7 corresponds in its structure to FIG. 4 and illustrates an event counter EC for a parallel model with multiple threads of execution T1, T2, T3, T4 in a model with a join step at the beginning of T4 after parallel threads of execution T2, T3. These follow after the first thread of execution T1. A database system 93 provides actual progress counter values.

In step 81 of the thread of execution T1 the actual value of the progress counter PC is read unsynchronized. For instance the progress counter is PC=0. Action A emits start and end events in step 82 yielding a local counter LC=0 at the start (EC=0:0) and LC=1 at the end (EC=0:1). In step 83 the actual value of the progress counter PC is read, incremented by the local counter LC and stored back to the database 93.

In the second thread of execution T2 the progress counter PC is read from the database in step 84. The emission of start and end events of action B1 occurs in step 85 and the progress counter PC is read, incremented and stored back in step 86. By way of example, the read progress counter PC in step 84 is PC=2, yielding event counters EC in step 45 with PC=2, LC=0 (EC=2:0) at the emission of the start event and PC=2 and LC=1 at the emission of the end event of action B1 (EC=2:1). In the parallel third thread of execution T3 the progress counter PC is read from the database in step 87. The emission of the start and end events of action B2 occurs in step 88 and the progress counter PC is read, incremented and stored back in step 89. By way of example, the read progress counter PC in step 87 is PC=2, yielding event counters EC in step 88 with EC=2:0 (PC=2, LC=0) at the emission of the start event and EC=2:1 (PC=2 and LC=1) at the emission of the end event of action B2.

The third thread of execution T3 starts earlier and ends earlier than the second thread of execution T2. Now the threads of execution T2, T3 join at a fourth thread of execution T4 in which action C happens. In step 90 of the fourth thread of execution T4 the progress counter PC is read unsynchronized, yielding e.g. PC=6, with action C emitting start and end events in step 91, yielding the local counter LC=0 at the emission of the start event (EC=6:0) and LC==1 at the emission of the end event of the action C EC=6:1). The progress counter PC is read, incremented and stored back in step 92. The encircled numbers indicate in which steps the progress counter PC is changed. In the database 93 the time dependent development of the progress counter PC is illustrated by the indicated encircled numbers.

As a general result of all the embodiments described above, the event counter EC is partially ordered for e.g. two actions A1 and A2 yielding $$(PC(A2)>PC(A1)) \rightarrow EC(A2)>EC(A1)$$

For a first action A1 and a second action A2 which occur in different threads of execution the event counter EC(A2) for the second action A2 is larger than event counter EC(A1) for the first event A1 if the progress counter PC(A2) for the second event A2 is larger than the progress counter PC for the first event A1.

$$(PC(A2)=PC(A1))+(LC(A2)>LC(A1)) \rightarrow EC(A2)>EC(A1)$$

For a first event A1 and a second event A2 which occur in the same thread of execution, the event counter EC(A2) for the second event A2 is larger than event counter EC(A1) for the first event A1 if the progress counter PC(A2) for the second event A2 is equal to the progress counter PC(A1) of the first event A1 and the local counter LC(A2) for the second event A2 is larger than the local counter LC(A1) for the first event A1.

Given two events A1 and A2, the event counter EC according to the invention can reliably provide the following characteristics:

Event A2 is modeled to be sequentially executed after a event A1, →EC(A2)>EC(A1), i.e. the event counter EC(A2) for the second event A2 is larger than the event counter EC(A1) for the first event A1 (logical dependency).

The invention can take the form of an entirely hardware embodiment, an entirely software embodiment or an embodiment containing both hardware and software elements. In a sample embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Figure 8:
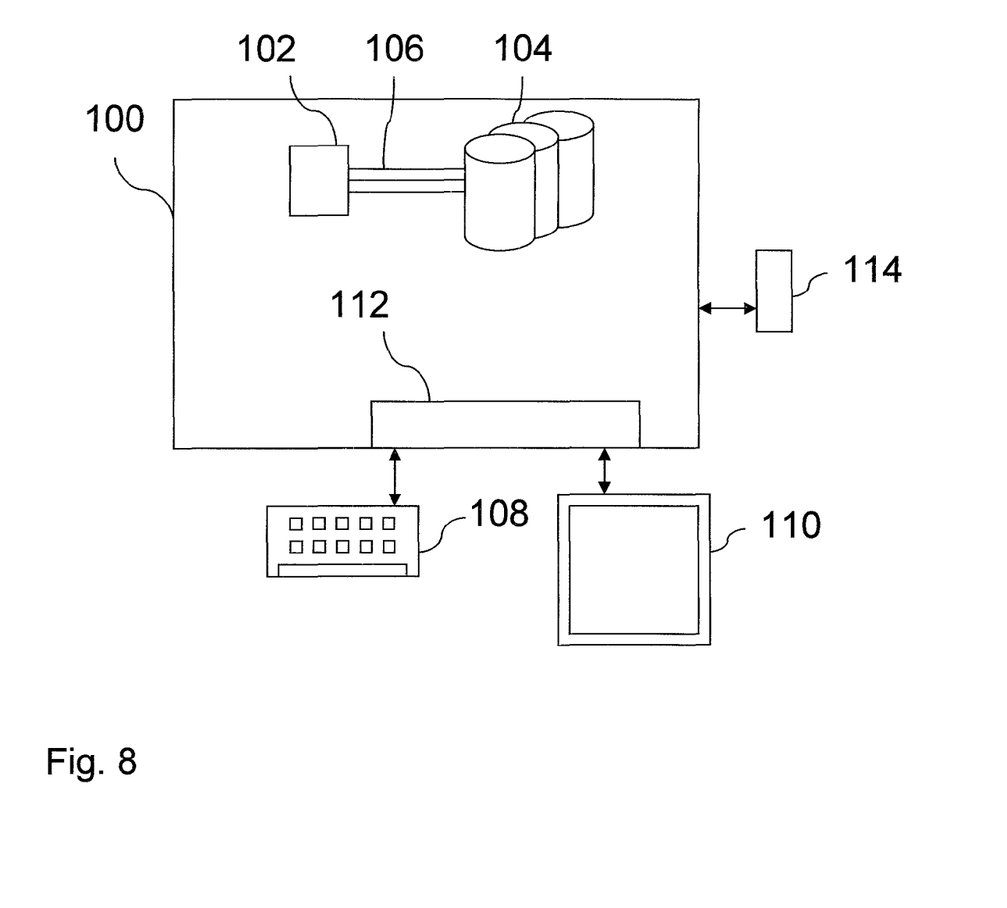
FIG. 8 a block diagram of a preferred data processing system according to an embodiment of the invention.

A preferred data processing system 100 as schematically depicted in FIG. 8 suitable for storing and/or executing program code will include at least one processor 102 coupled directly or indirectly to memory elements 104 through a system bus 106. The memory elements 104 can include local memory employed during actual execution of the program code, bulk storage, and cache memories which provide temporary storage of at least some program code in order to reduce the number of times code must be retrieved from bulk storage during execution.

Input/output or I/O-devices 108, 110 (including, but not limited to keyboards, displays, pointing devices, etc.) can be coupled to the system 100 either directly of through intervening I/O controllers 112.

Network adapters 114 may also be coupled to the system 100 to enable the data processing system or remote printers or storage devices through intervening private or public networks. Modems, cable modem and Ethernet cards are just a few of the currently available types of network adapters.

In a sample embodiment of data processing system 100 the described method can be performed. The model can be stored in the internal memory elements 104. Alternatively, external memory elements can be coupled to the system 100 and the processor 102, respectively.

The invention claimed is:

1. A method for counting events in an information technology system which performs one or more threads of executions, the method comprising the steps of:
   providing an event counter, the event counter comprising a tuple comprising:
      a progress counter used across multiple threads of execution, counting the number of events emitted by one or more actions with a logical dependency which occur in different threads of execution; and
      a local counter used within a single thread of execution counting the number of events emitted by one or more actions which occur within a single thread of execution; and
   executing the one or more threads, wherein the event counter is transformed by each event to accurately order the events.

2. The method according to claim 1, wherein an increment step for the progress counter is performed once per thread of execution.

3. The method according to claim 2, wherein the increment step increases the progress counter by one.

4. The method according to claim 1, wherein the progress counter is maintained in a transactional system.

5. The method according to claim 1, wherein the progress counter is maintained in a persistent store.

6. The method according to claim 1, wherein the progress counter is provided to the event counter at the beginning of a thread of execution.

7. The method according to claim 1, wherein the progress counter is provided at the emission of an event at the beginning of an action occurring in a thread of execution.

8. The method according to claim 1, wherein the progress counter is read unsynchronized from a data source containing values of the progress counter.

9. The method according to claim 1, wherein the progress counter is read and incremented at the end of the thread of execution.

10. The method according to claim 9, wherein the increment increases the progress counter by the number of events that occurred in the thread of execution that was executed.

11. The method according to claim 1, wherein the progress counter is read and incremented at the beginning of the thread of execution.

12. The method according to claim 11, wherein the read step of the progress counter is performed synchronized in a separate local transaction.

13. The method according to claim 1, wherein in response to parallel threads of execution, a join step is performed in a subsequent thread of execution which depends on the end of all parallel threads of execution.

14. The method according to claim 1, wherein in response to parallel threads of execution, a join step is performed in a one of the parallel threads of execution.

15. The method according to claim 14, wherein the progress counter is read again before the join step is executed.

16. The method according to claim 1, wherein, in response to a first event and a second event which occur in different threads of execution and the progress counter for the second event being larger than the progress counter for the first event, the event counter for the second event is larger than event counter for the first event.

17. The method according to one of the preceding claims, wherein in response to a first event and a second event which occur in the same thread of execution and the progress counter for the second event is equal to the progress counter of the first event and the local counter for the second event is larger than the local counter for the first event, the event counter for the second event is larger than event counter for the first event.

18. The method according to claim 1, wherein in response to a second event modeled to be sequentially executed after a first event, the event counter for the second event is larger than the event counter for the first event.

19. A program product comprising a computer useable storage device having a computer readable program, wherein the computer readable program when executed on a computer causes the computer to perform a method for counting events in an information technology system which performs one or more threads of executions, the program product comprising:
   program code for providing an event counter, the event counter comprising a tuple comprising:
      a progress counter used across multiple threads of execution, counting the number of events emitted by one or more actions with a logical dependency which occur in different threads of execution; and
      a local counter used within a single thread of execution counting the number of events emitted by one or more actions which occur within a single thread of execution: and
   program code for executing the one or more threads, wherein the event counter is transformed by each event to accurately order the events.

20. A program product comprising a computer useable storage device including a computer readable program, wherein the computer readable program when executed on a computer causes the computer to introduce an event counter comprising a tuple comprising:
   a progress counter used across multiple threads of execution, counting the number of events emitted by one or more actions with a logical dependency which occur in different threads of execution: and
   a local counter used within a single thread of execution counting the number of events emitted by one or more actions which occur within a single thread of execution.

21. A data processing system for execution of a data processing program comprising software code portions for performing a method for counting events in an information technology system which performs one or more threads of executions, the system comprising:
   means for providing an event counter, the event counter comprising a tuple comprising:
      a progress counter used across multiple threads of execution, counting the number of events emitted by one or more actions with a logical dependency which occur in different threads of execution; and
      a local counter used within a single thread of execution counting the number of events emitted by one or more, actions which occur within a single thread of execution; and
   means for executing the one or more threads, wherein the event counter is transformed by each event to accurately order the events.

22. A dam processing program for execution in a data processing system comprising software code portions for performing a method when said program is run on a computer, wherein an event counter is introduced comprising a tuple comprising:
- a progress counter to be used across multiple threads of execution, counting the number of events emitted by one or more actions with a logical and dependency which occur in different threads of execution; and
- a local counter to be used within a single thread of execution counting the number of events emitted by one or more actions which occur within a single thread of execution.

* * * * *